United States Patent [19]

Schneller

[11] Patent Number: 4,584,224

[45] Date of Patent: Apr. 22, 1986

[54] TAPERED EDGE BOARD

[75] Inventor: Joseph W. Schneller, Williamsville, N.Y.

[73] Assignee: National Gypsum Company, Dallas, Tex.

[21] Appl. No.: 713,350

[22] Filed: Mar. 18, 1985

[51] Int. Cl.[4] ........................... B32B 3/02; B32B 3/06

[52] U.S. Cl. ........................................ 428/60; 428/157; 428/192; 428/194; 156/45; 52/417

[58] Field of Search .................... 428/60, 57, 192, 194, 428/157; 156/45; 52/417

[56] References Cited

U.S. PATENT DOCUMENTS 1,660,834 2/1928 Erola ...................................... 52/417

3,806,389 4/1974 Gwynne ......................... 428/192 X

*Primary Examiner*—Alexander S. Thomas

*Attorney, Agent, or Firm*—Robert F. Hause

[57] ABSTRACT

A tapered edge wallboard, for monolithic wall construction, in which the taper is formed by removal of core material along an edge, as by a saw cut, and a thin layer of edge material is bent inward, closing the saw-cut groove and resulting in a taper.

15 Claims, 2 Drawing Figures

TAPERED EDGE BOARD

This invention relates to a tapered edge board and to the method of forming a tapered edge on a board by the removal of material from the core of the board.

BACKGROUND OF THE INVENTION

When large thin flat boards are used as the base for forming a monolithic wall, it has been common to form the side edges of the board tapered and slightly thinner than the rest of the board. When two tapered edge boards are affixed side by side, a wide, shallow V-shaped groove is formed which can be filled with a joint concealing material to hide the joint, with the joint concealing material being troweled smooth and flush with the rest of the board.

Substantially all homes and a large percentage of commercial construction involves the use of gypsum wallboard with tapered side edges, concealed by paper tape and joint compound. Prior patents have suggested methods for forming tapered end edges on the boards, also, but none have met with any substantial commercial success. One reason for the lack of greater success is that the need arises, too often, for cutting part of the end off, to obtain a desired length, other than the factory length, which cutoff removes one of the two tapered end edges.

SUMMARY OF THE INVENTION

The present invention consists of a tapered edge of a board which is formed by the physical removal of a portion of the interior core, along the edge. In one embodiment, the board is first cut to the desired length, and then a saw cut is made along the end edge, extending into the end edge in a plane which is a fraction of an inch from and parallel to, the front face of the board. The front face is then bent toward the back surface, closing the groove formed by the saw cut, and forming a tapered end edge.

It is an object of the present invention to provide a novel method of forming a tapered edge on a board.

It is a further object to provide a novel structure of a tapered board edge.

It is a still further object to provide an improved method of forming tapered edges on the ends of gypsum wallboard.

BRIEF DESCRIPTION OF THE DRAWINGS

These and other objects and advantages will be more readily apparent when considered in relation to the preferred embodiments, as set forth in the specification, and shown in the drawings, in which.

DESCRIPTION OF THE PREFERRED EMBODIMENTS

Figure 1:
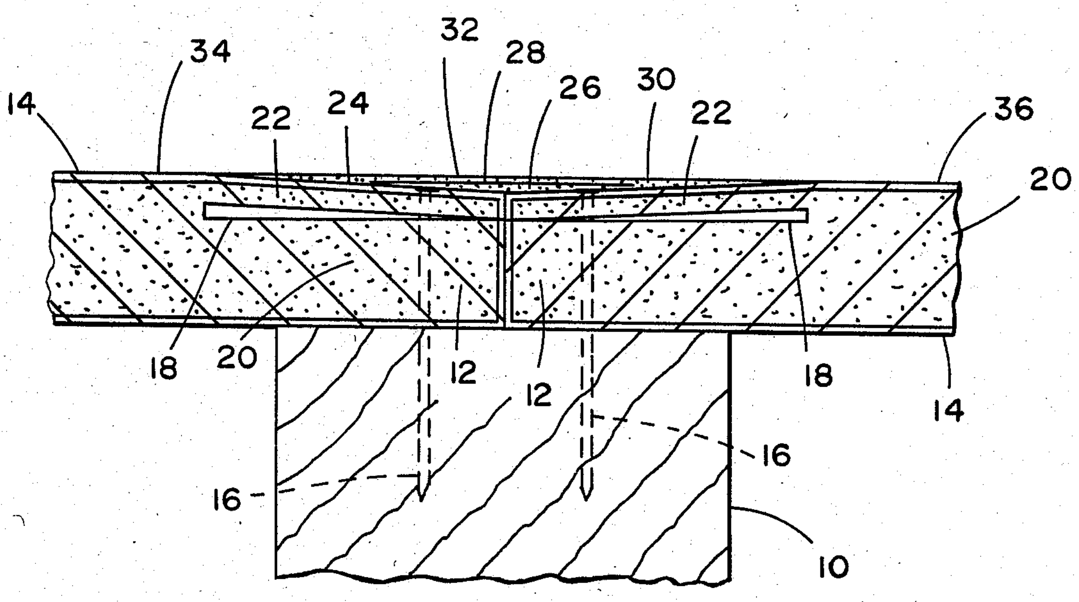
FIG. 1 is a sectional view of a finished joint of two wallboards, made in accordance with the present invention.

Referring to FIG. 1, there is shown, in cross section, a vertical wood stud 10 to which has been affixed the abutting edges 12, 12 of two adjacent gypsum wallboards 14, 14, affixed by nails 16, 16.

In accordance with the invention, each edge 12 has a saw-cut groove 18 formed in the board core 20, extending into the edge a distance of between about ½ inch to 3 inches, preferably about 1 inch, leaving a thin layer 22 of edge, between the groove 18 and the edge front surface 24, which layer 22 is able to be bent inward. The saw-cut groove 18 has a width, corresponding to the thickness of the saw used, of preferably about 1/32 inch, and the layer 22 is preferably about 1/16 inch thick.

As shown in FIG. 1, the thin edge layers 22, 22 are bent inward by the nails 16, 16, forming a wide shallow groove 26. Groove 26 has a narrow paper tape 28 and a thin coating of joint compound 30 adhered therein, forming a flat outer surface 32 flush with the outer surface 34 of the other portion of the wallboard 14, producing a perfectly flat monolithic surface.

The wallboard 14 of FIG. 1, as shown, is formed with a paper cover 36 enclosing a gypsum core 20. The paper cover 36 provides the necessary strength to maintain the integrity of the thin edge layer 22.

As will be seen in FIG. 1, the thin layer 22 includes a relatively thick layer of board core 20 material in addition to the relatively thin layer of paper cover 36. Other forms of wallboards can also be modified for use in accordance with this invention, such as a fiberglass fabric faced cement core board, a homogeneous board of cellulose fiber reinforced gypsum, or a foamed plastic board. With the more flexible foamed plastic board, the groove can be considerably larger and farther from the front surface than with a gypsum board.

The invention is particularly adapted for providng a tapered edge at the end of a gypsum board which was produced with tapered edges on the side edges; however, it is contemplated that a board could be produced with tapered side edges made in accordance with this invention.

Figure 2:
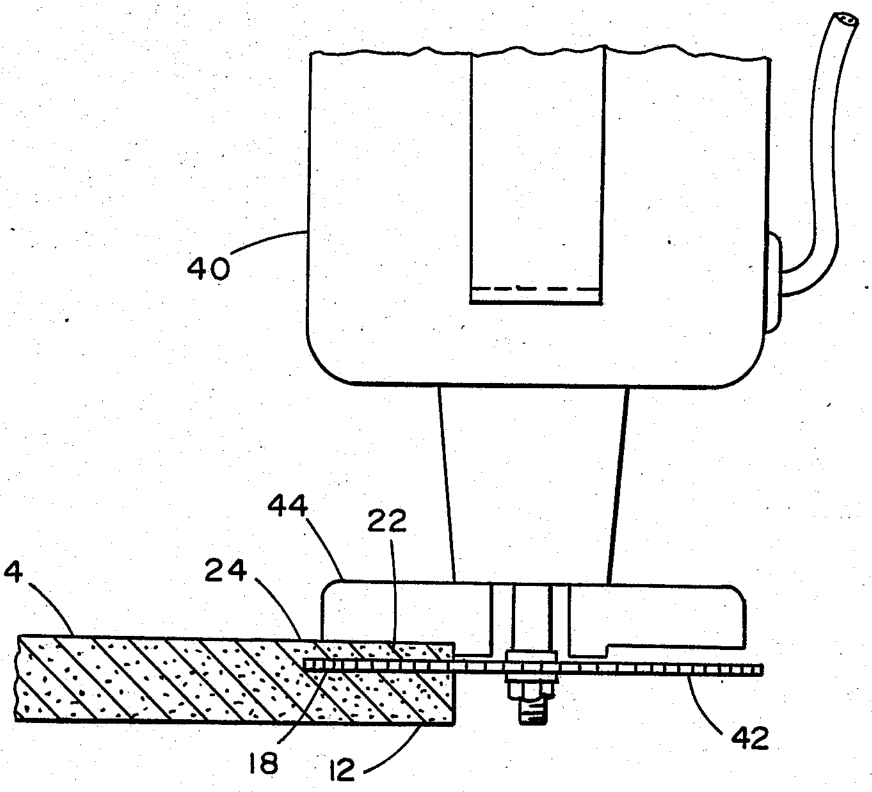
FIG. 2 is a sectional view of an edge of a wallboard, with a circular saw in the process of removing core material to permit a taper to be formed along the edge of the board.

Referring to FIG. 2, there is shown a cross section of an edge 12 of a gypsum wallboard 14, just prior to being used in a wall construction, with a small circular saw 40 being used to form a saw-cut groove 18, with a 1/32" thick saw blade 42 being advanced along the length of the edge 12. Saw 40 has a guide 44 for maintaining the saw blade 42 in a plane parallel to the edge front surface 24, spaced from the surface 24 by about 1/16 inch.

In constructions where reliance on nails to hold the thin layer 22 in a bent form is not desirable or attainable, it is contemplated that the groove 18 may be adhesively held closed. If the groove 18 is filled with an adhesive or a settable plaster, reinforcement is thus provided for the otherwise potentially fragile thin layer 22.

Having completed a detailed disclosure of the preferred embodiments of my invention, so that others may practice the same, I contemplate that variations may be made without departing from the essence of the invention.

I claim:

1. A tapered edge board comprising a front face which is substantially flat with the exception of a narrow elongate area adjacent at least one substantially straight edge of said board, said front face having a substantially flat tapered surface along said at least one substantially straight edge, said tapered surface being formed by the presence of a thin, deep groove formed to extend into the edge of said at least one substantially straight edge and by a thin layer between said thin, deep groove and said front face being bent inwardly to substantially close said thin, deep groove at said edge.

2. A board as defined in claim 1 wherein said thin, deep groove is a saw cut.

3. A board as defined in claim 1 wherein said thin, deep groove contains a cementitious material in sufficient quantity to hold said thin layer in a bent form.

4. A board as defined in claim 3 wherein said cementitious material is present in sufficient quantity to reinforce and strengthen said thin layer.

5. A monolithic wall comprising two tapered edge boards as defined in claim 1, said two boards each having a tapered edge formed by said thin, deep groove and said bent thin layer abutting one another, forming a joint therebetween with a wide, shallow groove in the front surface surrounding said joint and extending along said joint, said wide, shallow groove being formed by said tapered edges, said wide shallow groove being filled with a joint filler compound whereby a monolithic front surface is produced on said two boards.

6. A monolithic wall as defined in claim 5 wherein sid two boards are paper-covered gypsum wallboards.

7. A monolithic wall as defined in claim 5, wherein said wide, shallow groove also contains a narrow, thin strip of reinforcing tape.

8. A monolithic wall as defined in claim 5 wherein said boards have side edges and end edges and wherein said tapered edges formed by said thin, deep grooves and said bent thin layers are on abutting end edges of said boards.

9. A board as defined in claim 1 wherein the ratio of the thickness of said thin layer to the thickness of said groove is about 2:1.

10. A tapered edge wallboard comprising an elongate edge, a thin, deep groove formed in said edge and a thin layer of board edge bent inwardly, substantially closing said thin, deep groove and forming a substantially flat taper on the board surface, said thin, deep groove having a depth to thickness ratio of about 16:1 to about 96:1.

11. A wallboard as defined in claim 10 wherein said thin, deep groove is formed by a saw cut extending into the edge.

12. A wallboard as defined in claim 10 wherein said wallboard is a paper-covered gypsum core wallboard.

13. A wallboard as defined in claim 12 wherein said wallboard has side edges which were formed with a taper during forming of the wallboard and having a tapered edge at at least one of the two ends which is formed by said thin, deep groove and inwardly bent thin layer.

14. A board as defined in claim 12 wherein said groove has a thickness of about 1/32 inch and said thin layer has a thickness of about 1/16 inch.

15. A board as defined in claim 12 wherein said thin layer includes a relatively thick layer of board core material and a relatively thin layer of paper cover.

* * * * *